(12) United States Patent
Jeong et al.

(10) Patent No.: US 7,164,109 B2
(45) Date of Patent: Jan. 16, 2007

(54) SOLAR POSITION TRACING SENSOR USING THIN FILM PATTERN OF BOTH-SIDED PRINTED CIRCUIT BOARD

(75) Inventors: Cheol-Oh Jeong, Gyeonggi-do (KR); Jong-Won Eun, Daejon (KR)

(73) Assignee: Electronics and Telecommunications Research Institute (KR)

( * ) Notice: Subject to any disclaimer, the term of this patent is extended or adjusted under 35 U.S.C. 154(b) by 259 days.

(21) Appl. No.: 10/991,714

(22) Filed: Nov. 17, 2004

(65) Prior Publication Data

US 2005/0133080 A1    Jun. 23, 2005

(30) Foreign Application Priority Data

Dec. 18, 2003   (KR) ..................... 10-2003-0093094

(51) Int. Cl.
*G01C 21/02*       (2006.01)
(52) U.S. Cl. .................... 250/203.4; 250/238; 250/221
(58) Field of Classification Search ............. 250/203.4, 250/221, 238
See application file for complete search history.

(56) References Cited

U.S. PATENT DOCUMENTS 4,114,596 A  *  9/1978  Chang et al. ............... 126/607

6,018,122 A       1/2000   Hibino et al.
6,313,396 B1      11/2001  Glenn

OTHER PUBLICATIONS

"A Study on the Fluid Definite Equipment Inside Chamber Using Photo-Coupler", J. Oh, et al., Korean Institute of Communication and Sciences, vol. 6, pp. 720-725, Nov. 1996.

* cited by examiner

*Primary Examiner*—Que T. Le
(74) *Attorney, Agent, or Firm*—Blakely Sokoloff Taylor & Zafman

(57) ABSTRACT

Provided is a solar position tracing sensor having a high resolving power by using a temperature coefficient and heat conductivity of fine patterns on a printed circuit board (PCB). The solar position tracing sensor is reliable and has a wide application ranges for both celestial and terrestrial applications. It can be produced in mass at cheep cost. The solar position tracing sensor includes: a light condenser for condensing and filtering sunlight; a PCB having light reception patterns on the top and bottom surfaces; a heat protection plate for preventing the temperature of the entire PCB from being increased; a reference voltage supplier for providing a reference voltage source to find out a specific light reception pattern whose temperature is increased from radiation of the sunlight; and a voltmeter for measuring alteration in voltage based on the alteration in a temperature coefficient of the light reception pattern with increased temperature.

6 Claims, 4 Drawing Sheets

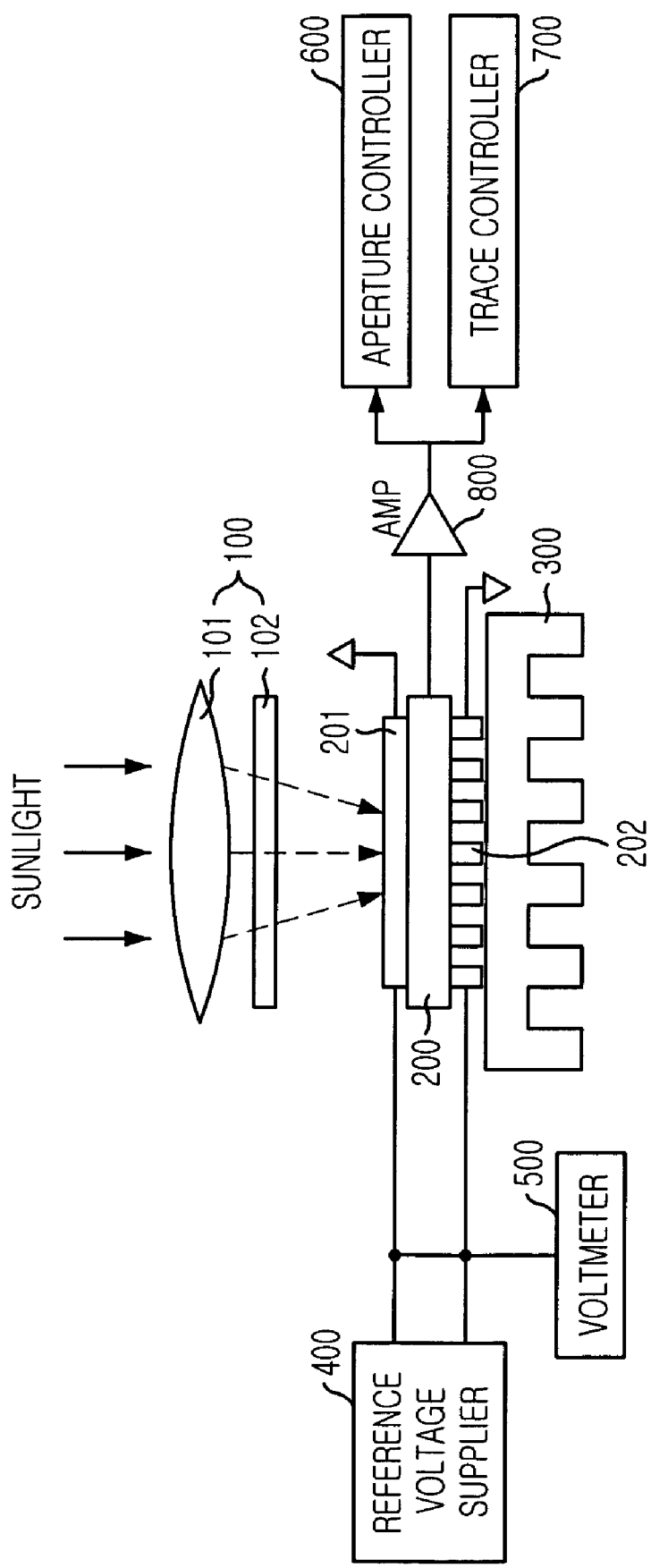

SOLAR POSITION TRACING SENSOR USING THIN FILM PATTERN OF BOTH-SIDED PRINTED CIRCUIT BOARD

FIELD OF THE INVENTION

The present invention relates to a solar position tracing sensor; and, more particularly, to a solar position tracing sensor using a temperature coefficient and fine heat conductivity of patterns of a printed circuit board (PCB).

DESCRIPTION OF RELATED ART

Celestial and terrestrial equipment adopts controlling apparatuses capable of tracing a solar position for satellite position control, antenna direction control, navigation, sunlight power generation and the like. At present, semiconductor devices such as a photo transistor array are used to trace a position. When a light source with an array of optical devices such as lens and prism activates a photo transistor on a particular area of a photo transistor array with the photoelectric effect, the direction of the photo transistor array is controlled to activate a photo transistor on a specific position of the photo transistor array by analyzing the position of the photo transistor and operating a controller in connection with the photo transistor.

When the solar position tracing sensor is designed and fabricated, the characteristics of the photo transistor array should be analyzed, and bonding of a device and interconnection between an amplifier, an operator and other peripheral devices should be considered scrupulously. Since the performance is affected by fine particles greatly, the production cost is very high. This becomes a direct factor for high costs for development and production of a product which is not produced in mass but produced in a small number, such as items related to a satellite system.

SUMMARY OF THE INVENTION

It is, therefore, an object of the present invention to provide an inexpensive and reliable solar position tracing sensor with a vast application range for celestial and terrestrial systems, the solar tracing sensor having a high resolving power by utilizing a temperature coefficient and heat conductivity of a microfine printed circuit board (PCB) pattern.

In accordance with an aspect of the present invention, there is provided a solar position tracing sensor, which includes: a light condenser for condensing and filtering sunlight; a printed circuit board having light reception patterns on the top and bottom surfaces, the light reception patterns receiving the sunlight condensed and filtered in the light condenser; a heat protection plate for preventing the temperature of the entire printed circuit board from being increased, the heat protection plate is placed on the bottom surface of the printed circuit board; a reference voltage supplier for providing a reference voltage source to find out a specific light reception pattern whose temperature is increased from radiation of the sunlight, the reference voltage supplier being connected to one ends of the light reception patterns; and a voltmeter for measuring alteration in voltage based on the alteration in a temperature coefficient of the light reception pattern with increased temperature.

In accordance with another aspect of the present invention, wherein the reference voltage supplier of the solar position tracing sensor includes: a reference voltage source for finding the light reception pattern with increased temperature; a switching unit for providing the reference voltage source to the light reception patterns selectively; a switch controller for operating the switching unit; and a variable resistance for correcting device characteristics of the switching unit, the variable resistance being connected to output ends of the switching unit.

Preferably, a light reception pattern formed on the top surface and bottom surfaces of the printed circuit board includes a copper pattern having a temperature coefficient characteristic and excellent heat conductivity.

BRIEF DESCRIPTION OF THE DRAWINGS

The above and other objects and features of the present invention will become apparent from the following description of the preferred embodiments given in conjunction with the accompanying drawings, in which:

FIG. 1 is a diagram illustrating a solar position tracing sensor in accordance with an embodiment of the present invention;

DETAILED DESCRIPTION OF THE INVENTION

Figure 2A:
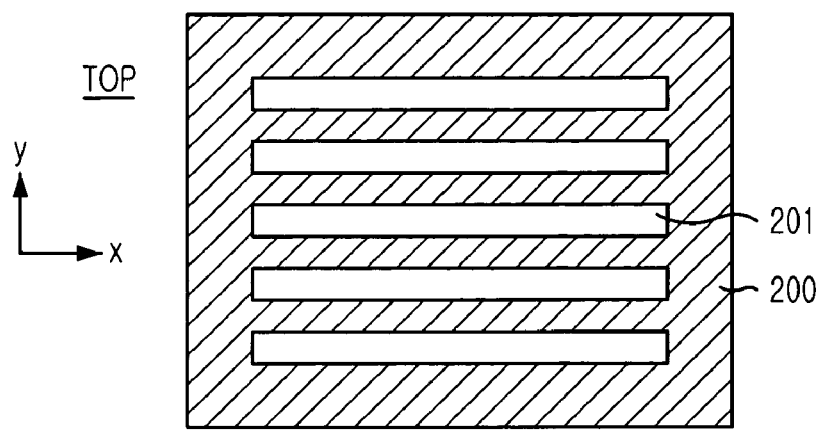
FIG. 2A is a top view showing a light reception pattern formed on the top surface of a printed circuit board of FIG. 1.

Other objects and aspects of the invention will become apparent from the following description of the embodiments with reference to the accompanying drawings, which is set forth hereinafter.

FIG. 1 is a diagram illustrating a solar position tracing sensor in accordance with an embodiment of the present invention.

As shown, the solar position tracing sensor includes a light condenser 100, a printed circuit board (PCB) 200, a heat protection plate 300, a reference voltage supplier 400, and a voltmeter 500. The light condenser 100 collects and filters sunlight. The printed circuit board 200 is provided with light reception patterns 201 and 202 for receiving sunlight collected and filtered in the light condenser 100 on the top and bottom surfaces. The heat protection plate 300 formed on the bottom surface of the printed circuit board 200 protects the printed circuit board 200 from being heated up by intensive sunlight. The reference voltage supplier 500 is connected to one ends of the light reception patterns 201 and 202 and provides a reference voltage for finding a particular light reception pattern 201 or 202 to which the sunlight is radiated. The voltmeter 500 measures voltage alteration based on the change in a temperature coefficient of the light reception pattern which receives the sunlight.

To be specific, the light condenser 100 includes a condensing lens 101 for condensing sunlight and a filter 102 for filtering the condensed sunlight. As for the heat protection plate 300, a heat sink is used.

The solar position tracing sensor further includes an aperture controller 600 for finding out a part where temperature is increased by the sunlight condensed by the condensing lens 101. If a condensing lens having a high condensing rate is used or intensive sunlight is inputted, the temperature in the surface of the printed circuit board 200 to which condensed sunlight is supplied can be increased excessively. If the condensing rate is lowered or a filter having a low photo transmission rate is used to prevent the excessive increase in temperature, the increase of temperature on the surface of the printed circuit board 200 becomes feeble in an environment with weak rays of light such as cloudy weather and thus the resolving power is deteriorated. Therefore, the aperture controller prevents burning caused by excessive incident light and increases sensitivity in an environment with little quantity of light by controlling the quantity of light radiated to a system to be maintained in a predetermined range. The aperture controller 600 is operated by taking the minute alteration in current and voltage minutely altered by the temperature sensed on the surface of the printed circuit board 200 as a control input, and it controls an aperture driving servomotor in a negative feedback controlling method.

The solar position tracing sensor can further includes a trace controller 700 for tracing a solar position by positioning the center of the printed circuit board 200 to be directed to the sunlight condensed in the light condenser 100. If the position of a part with increased temperature is sensed on the surface of the printed circuit board 200, the printed circuit board 200' is controlled to be perpendicular to the sunlight by using a driving means such as a servomotor.

Since the light reception patterns 201 and 202 of the printed circuit board 200 make delicate change in resistance according to a change in temperature, the alteration in current and voltage caused by the change in resistance are very delicate, too. Since the signal is too small to be used as an input to the aperture controller and the trace controller, an appropriate amount of gain is provided by using an amplifier 800.

The light reception patterns 201 and 202 and the reference voltage supplier 400 will be described with reference to the accompanying drawings.

Figure 2B:
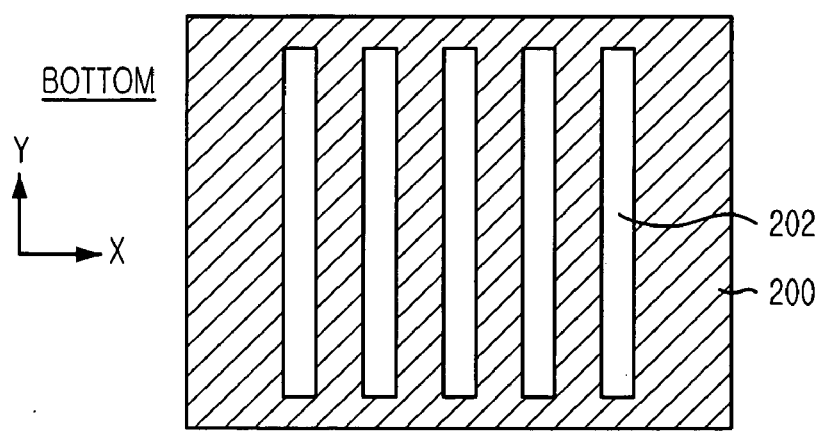
FIG. 2B is a bottom view depicting a light reception pattern formed on the top surface of a printed circuit board of FIG. 1.

FIG. 2A is a top view showing a light reception pattern formed on the top surface of a printed circuit board of FIG. 1, and FIG. 2B is a bottom view depicting a light reception pattern formed on the top surface of a printed circuit board of FIG. 1.

As shown in FIG. 2A, the light reception pattern 201 formed on the top surface of the printed circuit board 200 is a pattern of lines stretched in the direction of x. A plurality of such line patterns are arranged with a predetermined space.

As shown in FIG. 2B, a photo pattern 202 formed on the bottom surface of the printed circuit board 200 is a pattern of lines stretched in the direction of y. A plurality of such line patterns are arranged with a predetermined space.

According to FIGS. 2A and 2B, the arrangement directions of light reception patterns 201 and 202 formed on the top and bottom surfaces of the printed circuit board 200 are perpendicular to each other. Therefore, cross points 203 are created.

Figure 2C:
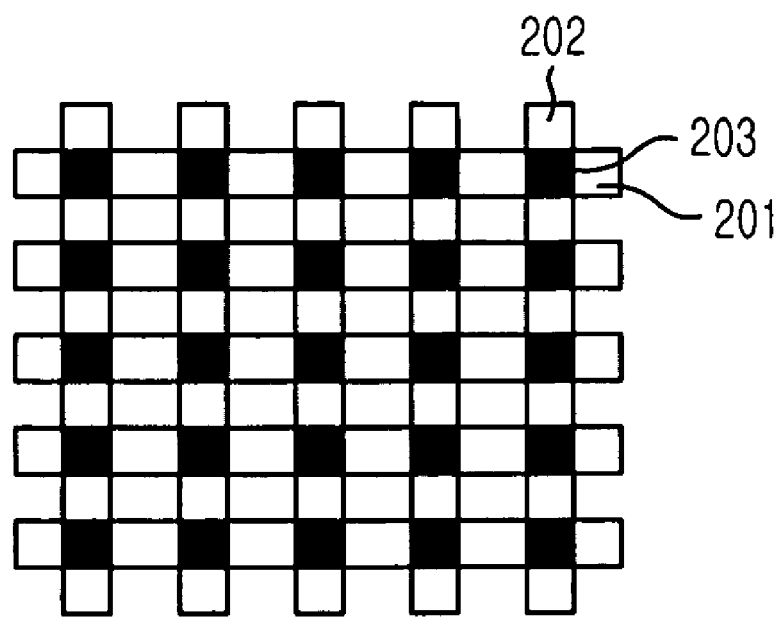
FIG. 2C is a diagram illustrating cross points formed by light reception patterns.

FIG. 2C is a diagram illustrating cross points formed by the light reception patterns. As the light reception patterns form the cross points 203, the position of the sunlight condensing point on the surface can be detected.

In FIGS. 2A and 2B, the light reception patterns on the top and bottom surfaces of the printed circuit board 200 have high heat conductivity and they are thin film patterns formed of copper.

Therefore, a specific light reception pattern that passes through the light reception area of the printed circuit board 200 comes to have a temperature higher than other light reception patterns. As a result, the resistance coefficient of the specific light reception pattern is changed due to the change in the temperature. If a regular level of voltage source is supplied to the specific light reception pattern, the resistance coefficient is changed.

Figure 3:
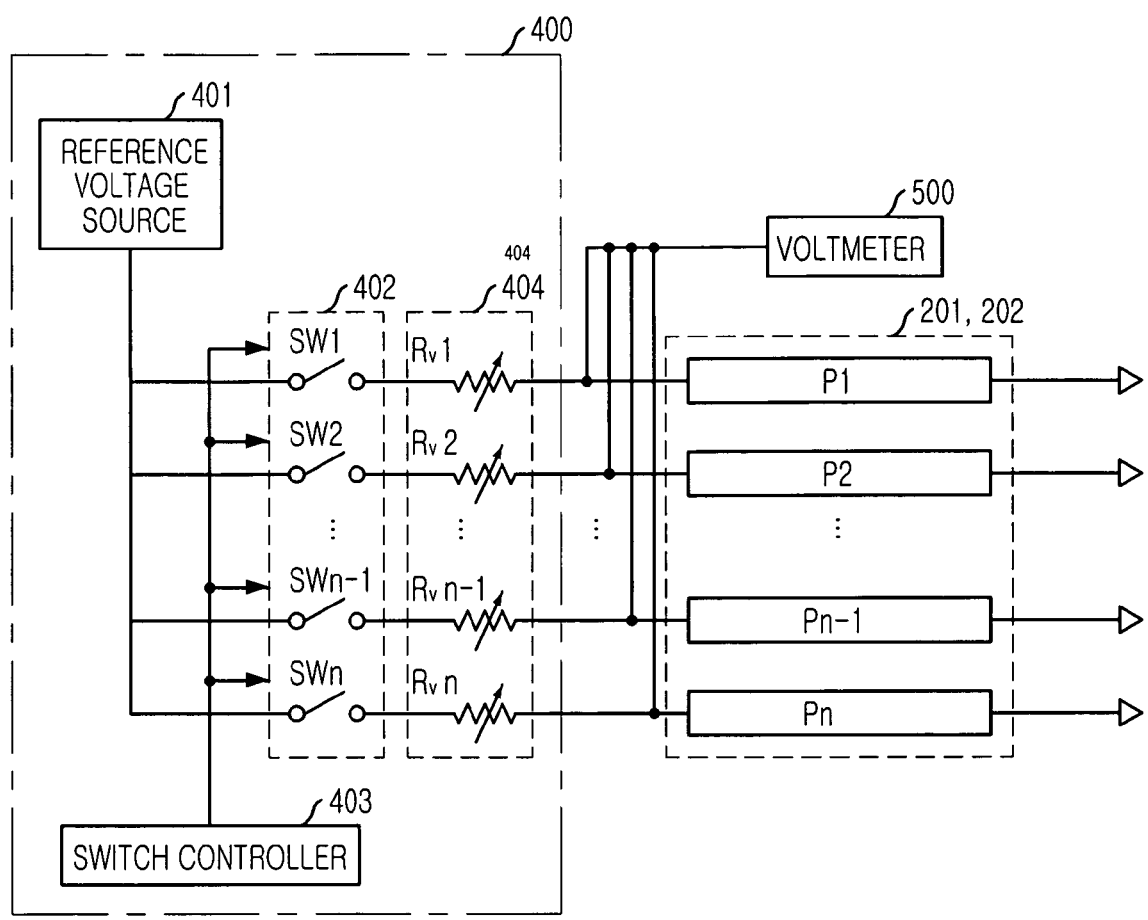
FIG. 3 is a schematic diagram describing connections among a reference voltage supplier, a voltmeter, and a light reception pattern of FIG. 1.

FIG. 3 is a schematic diagram describing connections among a reference voltage supplier, a voltmeter, and a light reception pattern of FIG. 1.

As shown in FIG. 3, the reference voltage supplier 400 includes a reference voltage source 401, a switching unit 402, a switch controller 403, and a variable resistance 404. The reference voltage source 401 finds a light reception pattern 201 or 202 with increased temperature. The switching unit 402 provides a reference voltage source 401 to the light reception patterns 201 and 202 optionally. The switch controller 403 operates the switching unit 402, and the variable resistance 404 accessing to an output end of the switching unit 402 corrects device characteristics of the switching unit 402.

The switching unit 402 includes a plurality of switches SW1 to SWn corresponding to a plurality of patterns P1 to Pn of the light reception patterns 201 and 202. The variable resistance 404 includes resistances $R_v1$, to $R_vn$ corresponding to the switches of the switching unit 402. The switch controller 403 utilizes a counter which is synchronized with a clock to operate a switch selectively. In particular, a ring counter is used.

The ring counter is used to determine the position of a light reception pattern with increased temperature among the light reception patterns 201 and 202 arrayed lengthwise and breadthwise. The ring counter used in the present invention provides a short circuit to the voltmeter to determine a temperature by selecting a pattern of the light reception patterns 201 and 202 arrayed in the printed circuit board 200 one by one sequentially. This way, the resistances of the light reception patterns 201 and 202 can be measured by using one amplifier and one voltmeter and the position of the light reception pattern 201 or 202 under measurement can be determined.

The resistances of the variable resistance 404 in the reference voltage supplier are connected to the patterns of the light reception patterns 201 and 202, respectively, and one voltmeter 500 is connected between the resistances of the variable resistance 404 and the patterns of the light reception patterns 201 and 202. Therefore, one ends of the patterns of the light reception patterns 201 and 202 are input terminals of the voltmeter 500. The other ends of the patterns of the light reception patterns 201 and 202 are grounded to thereby form short circuits.

Herein, the operation of the solar position tracing sensor will be described with reference to FIGS. 1 and 3.

First, sunlight (i.e., infrared ray), which is condensed in a condensing lens 101 is filtered through a filter 102. The filtered sunlight is radiated to a particular light reception pattern 201 on the surface of the printed circuit board 200 based on the position of the sun to thereby increase the temperature. Heat generated by the increased temperature is conducted to the light reception pattern 202 on the bottom through the top surface of the printed circuit board 200. The heat conduction is possible, because the light reception pattern 201 on the top surface is conducted to the light reception pattern 202 on the bottom surface of the printed circuit board 200 through a via hole.

As set forth above, the light reception pattern 201 which passes through the area to which sunlight is condensed on the printed circuit board 200 has a higher temperature than the other light reception pattern, i.e., the light reception pattern to which the sunlight is not condensed and the alteration in temperature results in alteration in the resistance coefficient. In this case, if a regular level of reference voltage source 401 is supplied from the outside, alteration in voltage is caused.

In other words, the switches of the switching unit 402 are turned on sequentially to supply the reference voltage source 401 for finding the light reception pattern 201 or 202 with an increased temperature. Then, the reference voltage source 401 is supplied to the light reception patterns 201 and 202 sequentially by the turn-on operation in the switching unit 402, and the alteration in voltage of the light reception patterns 201 and 202 s measured by utilizing the voltmeter 500.

Through these operations, the temperature of the light reception pattern with condensed sunlight is increased compared to those of the light reception patterns without sunlight condensed thereto and the resistance coefficient is altered. If the reference voltage source 401 is supplied, the voltage is altered.

In short, voltage is altered in a light reception pattern with alteration in the resistance coefficient, but the voltage remains unchanged in the other light reception patterns without sunlight condensed thereto. The light reception pattern with condensed sunlight can be found in this method.

If the light reception pattern with condensed sunlight is found out, the position of sunlight reception points can be confirmed.

As described above, the technology of the present invention can examine many light reception patterns with one voltmeter 500 by combining them with the counter. It can also form the light reception pattern in a delicate copper pattern to thereby fabricate a solar position tracing sensor with a high resolving power.

Since the printed circuit board used in the present invention is what is commonly used for the fabrication of a semiconductor device, it is reliable and cost-saving.

As set forth above, since the tracing sensor of the present invention utilizes a temperature characteristic and excellent heat conductivity of the light reception pattern, i.e., a copper pattern, formed on the printed circuit board whereas the conventional tracing sensors use a semiconductor device and/or optical device, the entire structure is simple and it can be produced easily.

In addition, the solar position tracing sensor of the present invention can be fabricated and mounted on celestial (which includes a low earth orbit, medium earth orbit, and geostationary orbit) and terrestrial equipment by selecting and utilizing parts according to the usage.

Since the present invention provides a solar position tracing system based on the position of the sun, such as an antenna position controller and a solar cell plate, and has a wide application range including for celestial and terrestrial application, it can embody a solar position tracing sensor that can be produced in mass at an inexpensive cost.

The present application contains subject matter related to Korean patent application No. 2003-93094, filed with the Korean Intellectual Property Office on Dec. 18, 2003, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A solar position tracing sensor, comprising:
   a light condenser for condensing and filtering sunlight;
   a printed circuit board having light reception patterns on the top and bottom surfaces, the light reception patterns receiving the sunlight condensed and filtered in the light condenser;
   a heat protection plate for preventing the temperature of the entire printed circuit board from being increased, the heat protection plate is placed on the bottom surface of the printed circuit board;
   a reference voltage supplier for providing a reference voltage source to find out a specific light reception pattern whose temperature is increased from radiation of the sunlight, the reference voltage supplier being connected to one ends of the light reception patterns; and
   a voltmeter for measuring alteration in voltage based on the alteration in a temperature coefficient of the light reception pattern with increased temperature.

2. The solar position tracing sensor as recited in claim 1, wherein the reference voltage supplier includes:
   a reference voltage source for finding the light reception pattern with increased temperature;
   a switching unit for providing the reference voltage source to the light reception patterns selectively;
   a switch controller for operating the switching unit; and
   a variable resistance for correcting device characteristics of the switching unit, the variable resistance being connected to output ends of the switching unit.

3. The solar position tracing sensor as recited in claim 1, wherein the switch controller includes a counter.

4. The solar position tracing sensor as recited in claim 1, wherein the light reception patterns include:
   a first light reception pattern with lines stretched in one direction on the surface of the printed circuit board; and
   a second light reception pattern with lines crossing the first light reception pattern perpendicularly on the surface of the printed circuit board.

5. The solar position tracing sensor as recited in claim 1, wherein the light reception patterns include copper patterns.

6. The solar position tracing sensor as recited in claim 1, further comprising:
   an aperture controller for controlling the quantity of sunlight that reaches on the printed circuit board by using current and voltage minutely changed based on the surface temperature of the printed circuit board as control inputs;
   a trace controller for positioning the center of the printed circuit board to be directed to the sunlight; and
   an amplifier for amplifying the current and voltage based on the resistance alteration caused by the change in temperature of the printed circuit board.

* * * * *